U S008799515B1

(12) United States Patent
Wu

(10) Patent No.: US 8,799,515 B1
(45) Date of Patent: Aug. 5, 2014

(54) REWRITING OF CLIENT-SIDE EXECUTED SCRIPTS IN THE OPERATION OF AN SSL VPN

(75) Inventor: Yuhua Wu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1672 days.

(21) Appl. No.: 11/166,779

(22) Filed: Jun. 27, 2005

(51) Int. Cl.
  G06F 15/16 (2006.01)
  G06F 17/21 (2006.01)
  G06F 17/24 (2006.01)
  H04L 29/08 (2006.01)

(52) U.S. Cl.
  CPC ........ *H04L 67/2814* (2013.01); *H04L 67/2823* (2013.01); *H04L 67/2804* (2013.01); *G06F 17/218* (2013.01)
  USPC ........... 709/246; 709/219; 715/235; 715/236; 726/12

(58) Field of Classification Search
  CPC ............ H04L 67/2814; H04L 67/2823; H04L 67/2804; G06F 17/218
  USPC ................ 709/246, 217, 219; 726/12, 14–15; 715/235, 236
  See application file for complete search history.

(56) References Cited

U.S. PATENT DOCUMENTS

| | | | | |
|---|---|---|---|---|
| 6,052,730 A * | 4/2000 | Felciano et al. | ............... | 709/225 |
| 6,119,165 A * | 9/2000 | Li et al. | ........... | 709/229 |
| 6,122,639 A * | 9/2000 | Babu et al. | ................ | 707/103 R |
| 6,298,446 B1 * | 10/2001 | Schreiber et al. | ............... | 726/27 |
| 6,589,291 B1 * | 7/2003 | Boag et al. | ..................... | 715/235 |
| 6,826,594 B1 * | 11/2004 | Pettersen | ....................... | 709/203 |
| 7,020,681 B1 * | 3/2006 | Ayyagari et al. | ............... | 709/203 |
| 7,054,952 B1 * | 5/2006 | Schwerdtfeger et al. | ..... | 709/246 |
| 7,120,703 B2 * | 10/2006 | Li et al. | .......................... | 709/246 |
| 7,146,564 B2 * | 12/2006 | Kim et al. | ...................... | 715/235 |
| 7,159,180 B2 * | 1/2007 | Ward | ............................. | 715/744 |
| 7,191,447 B1 * | 3/2007 | Ellis et al. | ...................... | 719/310 |
| 7,512,976 B2 * | 3/2009 | Burrows | ......................... | 726/20 |
| 7,774,831 B2 * | 8/2010 | Kuznetsov et al. | ............. | 726/12 |
| 7,818,435 B1 * | 10/2010 | Jellinek | ......................... | 709/229 |

(Continued)

FOREIGN PATENT DOCUMENTS

WO WO 02/27552 A2 * 4/2002 ............. G06F 17/30

OTHER PUBLICATIONS

Vink, Ian. Distributing Server Load to the Client with XML and XSL. 15 Seconds [online], Mar. 5, 2001 [retrieved on Jul. 20, 2008]. Retrieved from the Internet:<URL:http://www.internet.com/icom_cgi/print/print.cgi?url=http://www.15seconds.com/issue/010305.htm>.*

(Continued)

*Primary Examiner* — Rupal Dharia
*Assistant Examiner* — Wing Ma
(74) *Attorney, Agent, or Firm* — Harrity & Harrity, LLP

(57) ABSTRACT

A network device implements an SSL VPN gateway for client devices. The network device may receive a script destined for a client device. The script may include at least one later binding uniform resource locator (URL)-based link entity. The network device may rewrite the script to include additional script associated with the later binding URL-based link entity. The additional script is configured to execute at the client device to rewrite the later binding URL-based link entity with substitute links that refer to the network device. In this manner, the network device allows the external client devices to access back-end servers in a proprietary network without requiring the installation of custom software on the client devices.

20 Claims, 9 Drawing Sheets

(56) References Cited

U.S. PATENT DOCUMENTS

| | | | |
|---|---|---|---|
| 2002/0143821 A1* | 10/2002 | Jakubowski | 707/522 |
| 2002/0184525 A1* | 12/2002 | Cheng | 713/201 |
| 2003/0177449 A1* | 9/2003 | Rose | 715/530 |
| 2003/0200331 A1* | 10/2003 | Mahajan et al. | 709/238 |
| 2003/0217169 A1* | 11/2003 | James et al. | 709/231 |
| 2004/0039827 A1* | 2/2004 | Thomas et al. | 709/228 |
| 2004/0044965 A1* | 3/2004 | Toyama et al. | 715/523 |
| 2004/0205731 A1* | 10/2004 | Junkermann | 717/136 |
| 2004/0225749 A1* | 11/2004 | Pavlik et al. | 709/245 |
| 2004/0250213 A1* | 12/2004 | Shalabi et al. | 715/762 |
| 2004/0261017 A1* | 12/2004 | Perry | 715/513 |
| 2005/0086584 A1* | 4/2005 | Sampathkumar et al. | 715/501.1 |
| 2005/0091068 A1* | 4/2005 | Ramamoorthy et al. | 705/1 |
| 2005/0102281 A1* | 5/2005 | Takahashi | 707/3 |
| 2005/0108554 A1* | 5/2005 | Rubin et al. | 713/187 |
| 2005/0262357 A1* | 11/2005 | Araujo et al. | 713/182 |
| 2005/0273772 A1* | 12/2005 | Matsakis et al. | 717/136 |
| 2006/0168149 A1* | 7/2006 | Dispensa | 709/219 |

OTHER PUBLICATIONS

Server-Side vs. Client-Side Scripting. ASP 101 [online]. Sep. 16, 1999 [retrieved on Jul. 20, 2008]. Retrieved from the Internet:<URL:http://web.archive.org/web/19990916131435/http://www.asp101.com/tips/index.asp?id=25>.*

Behera, Suresh. XSL vs XSLT. In WeBlogs.ASP.Net [online]. ASP. net, Oct. 1, 2003; 11:59 AM [retrieved on Jul. 20, 2008]. Retrieved from the Internet:<URL:http://weblogs.asp.net/sbehera/archive/2003/10/01/29905.aspx>.*

Kay, Michael. Re: XSLT vs Perl. In Stylus Studio, XSL-LIST Mailing List Archive [online]. Bedford (MA): Stylus Studio, Feb. 3, 2004; 14:05:01 [retrieved on Jul. 20, 2008]. Retrieved from the Internet: <URL:http://www.stylusstudio.com/xsllist/200402/post30080.html>.*

Scripts in HTML documents, Section 18 of HTML, W3C Recommendation [online]. Nov. 20, 2002 [retrieved on Jul. 20, 2008]. Retrieved from the Internet:<URL:http://web.archive.org/web/20021120200359/http://www.w3.org/TR/REC-html40/interact/scripts.html>.*

Coplien, Jim, et al. Copy and Paste Programming. C2.com Wiki [online]. Sep. 29, 2003 [retrieved on Jul. 20, 2008]. Retrieved from the Internet:<URL:http://web.archive.org/web/20031023064017/http://c2.com/cgi/wiki?CopyAndPasteProgramming>.*

Prescod, Paul. XSLT and Scripting Languages [online]. May 22, 2002 [retrieved on Jul. 20, 2008]. Retrieved from the Internet:<URL:http://web.archive.org/web/20020522125433/http://www.idealliance.org/papers/xml2001/papers/html/05-03-06.html>.*

Araujo, Ken. SSL VPV gateways: a new approach to secure remote access. Continuity Central [online]. Oct. 31, 2003 [retrieved on Jul. 20, 2008]. Retrieved from the Internet:<URL:http://www.continuitycentral.com/feature038.htm>.*

Tip: Call JavaScript from an XSLT style sheet, [online], Apr. 1 2002 [retrieved on Jan. 2, 2010]. Retrieved from the Internet:<URL:http://www.ibm.com/developerworks/xml/library/x-tipxsltjs/index.html>.*

Michael Kay, Saxonica. XSL Transformations (XSLT) Version 2.0, W3C Working Draft, Nov. 5, 2004 [online] [retrieved on Nov. 19, 2010]. Retrieved from the Internet:<URL:http://www.w3.org/TR/2004/WD-xslt20-20041105/>.*

* cited by examiner

610

```
<?xml version="1.0"?>
<doc xml:base="http://192.168.15.100/today/"
    xmlns:xlink="http://www.w3.org/1999/xlink">
 <head>
  <title>Virtual Library</title>
 </head>
 <body>                    612
  <paragraph>See <link xlink:type="simple"
xlink:href="new.xml">what's
    new</link>!</paragraph>
 </body>
</doc>
```

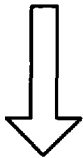

620

```
<?xml version="1.0"?>
<doc xml:base="http://companygateway.org/today/"
    xmlns:xlink="http://www.w3.org/1999/xlink">
 <head>
  <title>Virtual Library</title>
 </head>
 <body>                    622
  <paragraph>See <link xlink:type="simple"
xlink:href="new.xml?backendserver=192.168.18.100">w
hat's    new</link>!</paragraph>
 </body>
</doc>
```

FIG. 6

```
<?xml version="1.0" ?>                                    810
<xsl:stylesheet xmlns:xsl="http://www.w3.org/1999/XSL/
Transform" version="1.0">

<xsl:template match="COMPANY">

<LI><A>                   811
    <xsl:attribute name="HREF">        812
        <xsl:value-of select="@SYMBOL">.html
        </xsl:attribute>
        <xsl:value-of select="@NAME">
        </xsl:value-of>
  </A></LI>
```

```
<?xml version="1.0" ?>                               820
<xsl:stylesheet xmlns:xsl="http://www.w3.org/1999/XSL/Transform"
version="1.0">

<xsl:template match="COMPANY">

<LI><A>
    <xsl:attribute name="HREF">
        <xsl:call-template name ="GetDanaUrl" >      ⎤ 821
        <xsl:with-param name="srcUrl" >              ⎦
         <xsl:value-of select="@SYMBOL">
         </xsl:value-of>.html</xsl:with-param>
         <xsl:with-param name="IVEHostInfo"
select="'dev8.asglab.juniper.net'"/>                 ⎤
         <xsl:with-param name="DanaInfo"              ⎥ 822
select="',DanaInfo=dana.juniper.net+'"/>             ⎦
        </xsl:call-template>
        </xsl:attribute>
        <xsl:value-of select="@NAME">
        </xsl:value-of>
  </A></LI>
```

FIG. 8

REWRITING OF CLIENT-SIDE EXECUTED SCRIPTS IN THE OPERATION OF AN SSL VPN

BACKGROUND

1. Field of the Invention

Principles of the invention relate generally to network security and, more particularly, to managing secure communication sessions through a network gateway device.

2. Description of Related Art

A corporation may protect its network in a number of different ways. For example, a corporate security infrastructure may include firewalls, intrusion detection, Uniform Resource Locator (URL) filtering, and content inspection. Further, corporations may enforce certain procedures that must be followed by employees who wish to use processing devices to access the corporate network from within the office.

Telecommuters, mobile employees, remote business partners, etc. may desire remote access to a corporate network. At least some of these users may wish to access the corporate network over the Internet or via another network or group of networks.

One class of secure remote access technology that is gaining in popularity is the so-called Secure Sockets Layer (SSL) Virtual Private Network (VPN) connection. SSL VPNs compete with IP Security Protocol (IPSec) VPNs and have a number of potential advantages over IPSec VPNs, including application access flexibility, high security, and overall simplicity.

SSL VPNs may be implemented through an SSL VPN gateway device, which makes client/server applications available to remote users ("clients") through standard Internet browser software. The "back-end" server devices in a corporate network can securely connect with remote clients using security provided through an SSL connection, which is typically a standard feature in browsers. The SSL VPN gateway may operate in the application layer to communicate with the back-end servers and then transmit the information obtained from the back-end servers to the client's web browser. The back-end servers may be executing various corporate applications. The SSL VPN gateway may use built-in "screen scraping" protocols to split the emulation and display processing of the corporate applications so that only the applications' display is sent to the client browser. In this manner, corporate resources/applications can be made available to remote clients without requiring significant, or in some cases any, customization of the client computers.

A back-end server in an SSL VPN system may use a number of different techniques to manage and distribute data to clients. For example, the back-end server may be a server that delivers markup data to a browser at the client. One existing format for storing and managing data is the Extensible Markup Language (XML) format. XML is a general-purpose markup language capable of describing many different kinds of data. XML files typically describe data, but do not specify how the data is to be formatted or displayed. When XML data is presented to a user, it may first be transformed using a language such as XSLT (eXtensible Stylesheet Language Transformations) to produce a file encoded to describe how the file is to be formatted. A common example of the usage of XML and XSLT is to store data at a server in XML format. When the data is requested by a particular client device, the XML file is sent to the client with an XSLT script that is appropriate for the client. The client may then form the XML file for display based on the transformations specified in the XSLT script.

A problem that can occur when sending XML data and XSLT scripts through an SSL VPN gateway is that the XSLT scripts may contain later binding uniform resource locator (URL)-based link entities that are to be resolved at the client side. In other words, the scripts may contain links that cannot be fully defined until the XML data files and XSLT scripts are merged at the client. The links may resolve to additional resources on the back-end server. In the situation in which the back-end server is behind the SSL VPN gateway, however, the later binding URL-based link entities may not be directly reachable from the client because the SSL VPN gateway blocks the client from directly accessing the back-end server.

One existing solution to the above-mentioned problem is to install client-side software entities that examine the URL-based links as they are resolved at the client and rewrite them to point back to the SSL VPN gateway for eventual forwarding to the back-end server. This can be inconvenient for the client, however, as it requires each client to be installed with the client-side software entity.

SUMMARY OF THE INVENTION

One aspect is directed to a method that includes receiving a script destined for a client device at a network device, the script including at least one later binding uniform resource locator (URL)-based link entity. The method further includes rewriting the script to include additional script associated with the later binding URL-based link entity. The additional script is configured to execute at the client device to rewrite the later binding URL-based link entity with substitute links that refer to the network device.

Another aspect is directed to a network device including a processor and a memory operatively coupled to the processor. The memory includes programming instructions configured to establish a session between the network device and a client device; programming instructions configured to examine a script being transmitted to the client device through the network device, the script including at least one later binding URL-based link entity; and programming instructions configured to rewrite the script to include guarding code associated with the later binding URL-based link entity, the guarding code being configured to execute at the client device to rewrite the later binding URL-based link entity to refer to the network device.

Yet another aspect is directed to a system including a first component configured to rewrite fully resolved URL-based link entities in resources received from a computing device and destined for a client device. The system also includes a second component configured to process later binding URL-based link entities in eXtensible Stylesheet Language Transformations (XSLT) script received from the computing device and destined for the client device, the processed script being configured to execute at the client device to rewrite the later binding URL-based link entities with substitute links that refer to the network device.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 is a diagram illustrating a portion of an exemplary data file before and after processing by the gateway shown in FIG. 1;

FIG. 8 is a diagram illustrating an exemplary portion of a script file before and after processing by the gateway shown in FIG. 1.

DETAILED DESCRIPTION

The following detailed description of the invention refers to the accompanying drawings. The same reference numbers in different drawings may identify the same or similar elements. Also, the following detailed description does not limit the invention.

As described herein, a network device implements an SSL VPN gateway for client devices. The network device is configured to modify XSLT scripts and XML data that is delivered to client devices in such a manner that the XSLT scripts and XML data can be used at the client without requiring the client to be customized to operate with the SSL VPN gateway.

System Overview

Figure 1:
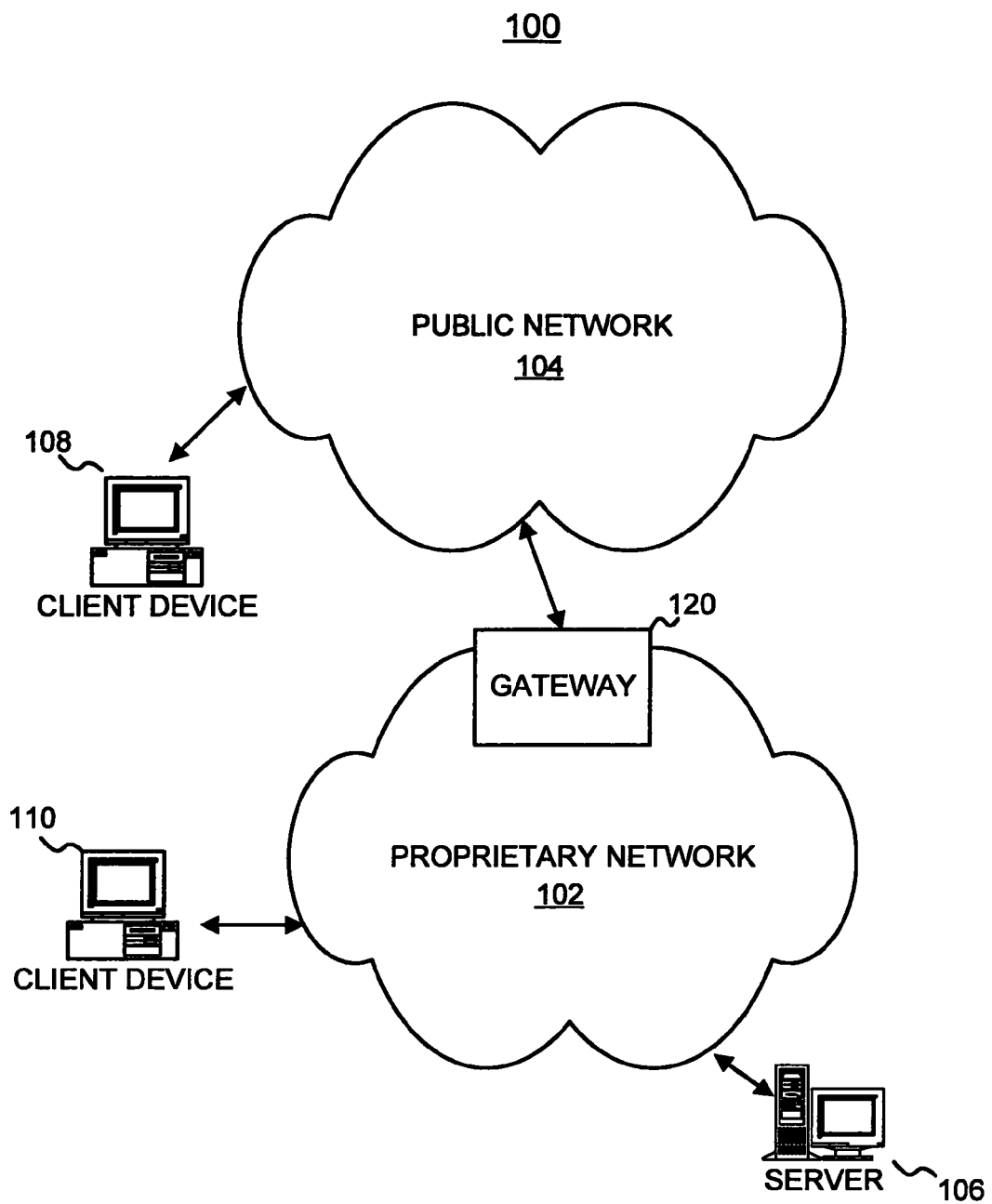
FIG. 1 is an exemplary diagram of a system in which concepts consistent with the principles of the invention may be implemented.

FIG. 1 illustrates an exemplary system 100 in which concepts consistent with the principles of the invention may be implemented. System 100 may include a proprietary network 102, a second network 104, a server 106, client devices 108 and 110, and a gateway 120. Proprietary network 102 may include one or more networks, such as a local area network (LAN), a wide area network (WAN), or the like. Proprietary network 102 may be a secure network (e.g., network 102 may be protected by network firewalls and/or security procedures). Network 104 may include a LAN, a WAN, a telephone network, such as the Public Switched Telephone Network (PSTN), a wireless network, or a combination of networks. In one implementation, proprietary network 102 may be, for example, a corporate network and network 104 may be, for example, the Internet.

Client devices 108 and 110 may be processing devices, such as personal computers (PCs), laptop computers, personal digital assistants (PDAs), cell phones, or other types of devices that users use to connect to networks 102 and 104. Server 106 and gateway 120 may also include a processing device or multiple distributed processing devices.

For clarity, only two client devices 108 and 110, one gateway 120, and one server 106 are shown in FIG. 1. One of ordinary skill in the art will recognize that an actual system of these devices may include additional client devices, gateways, and servers.

Clients 108 and 110 and may wish to connect to network 104 to access publicly available resources, such as web pages being served by public web servers. Clients 108 and 110 may also connect to proprietary resources stored on network 102, such as, in the situation when network 102 is a corporate network, proprietary corporate resources, such as corporate web pages, email applications, or other corporate data or corporate applications. These proprietary corporate resources may be hosted by processing device(s) such as server 106. Client device 110 may connect directly to server 106 over the secure proprietary network 102. Client 108, however, because it connects to proprietary network 102 via public network 104, may connect to server 106 via gateway 120. Gateway 120 may generally assist in providing security functions for proprietary network 102.

Figure 2:
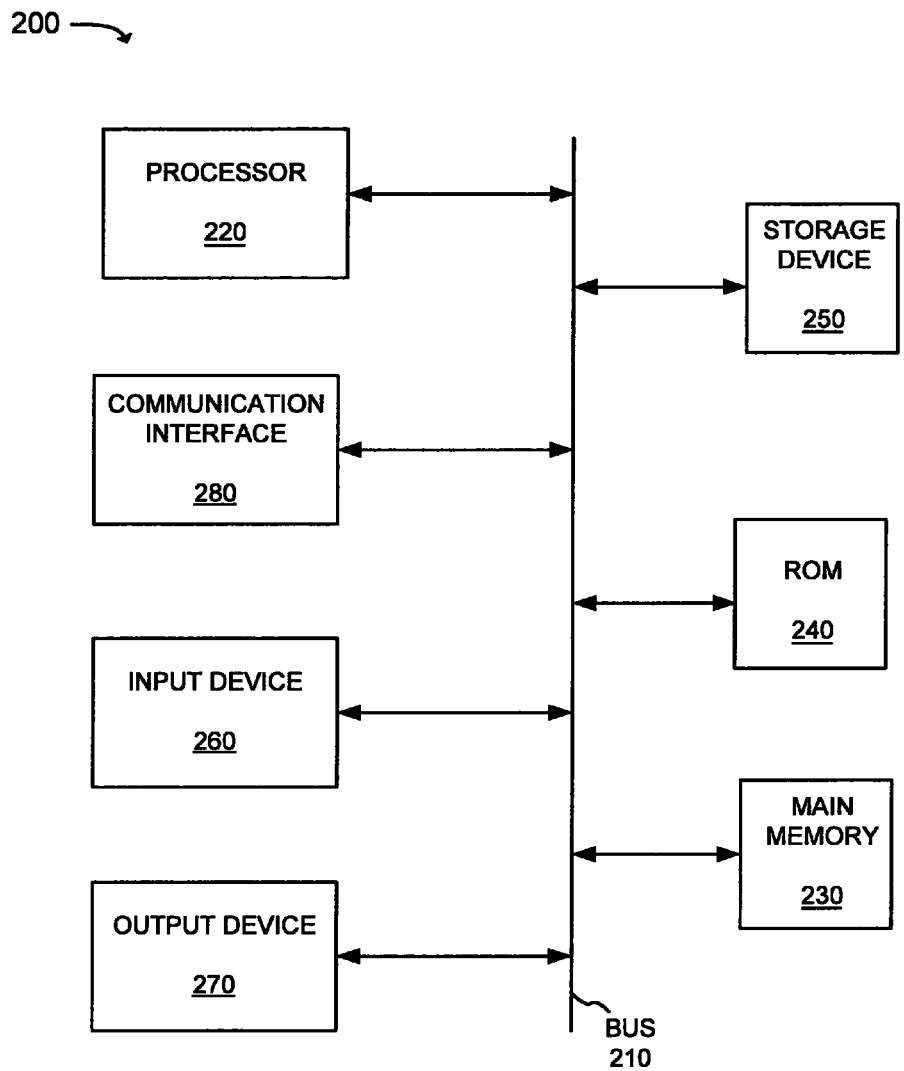
FIG. 2 is a functional block diagram that illustrates an exemplary processing device that may be used to implement the client devices, gateway, and/or server shown in FIG. 1.

FIG. 2 is a functional block diagram that illustrates an exemplary processing device 200 that may be used to implement client devices 108/110, gateway 120, and/or server 106. Device 200 may include a bus 210, a processor 220, a memory 230, a read only memory (ROM) 240, a storage device 250, an input device 260, an output device 270, and a communication interface 280. Bus 210 may permit communication among the components of device 200.

Processor 220 may include one or more conventional processors or microprocessors that interpret and execute instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of magnetic or optical recording medium and its corresponding drive, such as a magnetic disk or optical disk and its corresponding disk drive.

Input device 260 may include one or more mechanisms that permit a user to input information to system 200, such as a keyboard, a mouse, a pen, a biometric mechanism, such as a voice recognition device, etc. Output device 270 may include one or more mechanisms that output information to the user, including a display, a printer, etc. Communication interface 280 may include any transceiver-like mechanism that enables device 200 to communicate via a network. For example, communication interface 280 may include mechanisms for communicating with other networked devices and/or systems via wired, wireless or optical connections.

Device 200 may perform functions in response to processor 220 executing sequences of instructions contained in a computer-readable medium, such as memory 230. A computer-readable medium may include one or more memory devices and/or carrier waves. Such instructions may be read into memory 230 from another computer-readable medium, such as storage device 250, or from a separate device via communication interface 280.

Execution of the sequences of instructions contained in memory 230 may cause processor 220 to perform certain acts that will be described hereafter. In alternative implementations, hard-wired circuitry may be used in place of or in combination with software instructions to implement the present invention. Thus, the present invention is not limited to any specific combination of hardware circuitry and software.

Gateway 120

Gateway 120 may, for example, authorize client devices wishing to access resources of proprietary network 102 and act as an interface between applications in proprietary network 102 and clients in public network 104. In one implementation, gateway 120 may assist client device 108 in connecting to proprietary network 102 using an SSL VPN. In other implementations, gateway 120 may connect with client devices using connections other than SSL.

Figure 3:
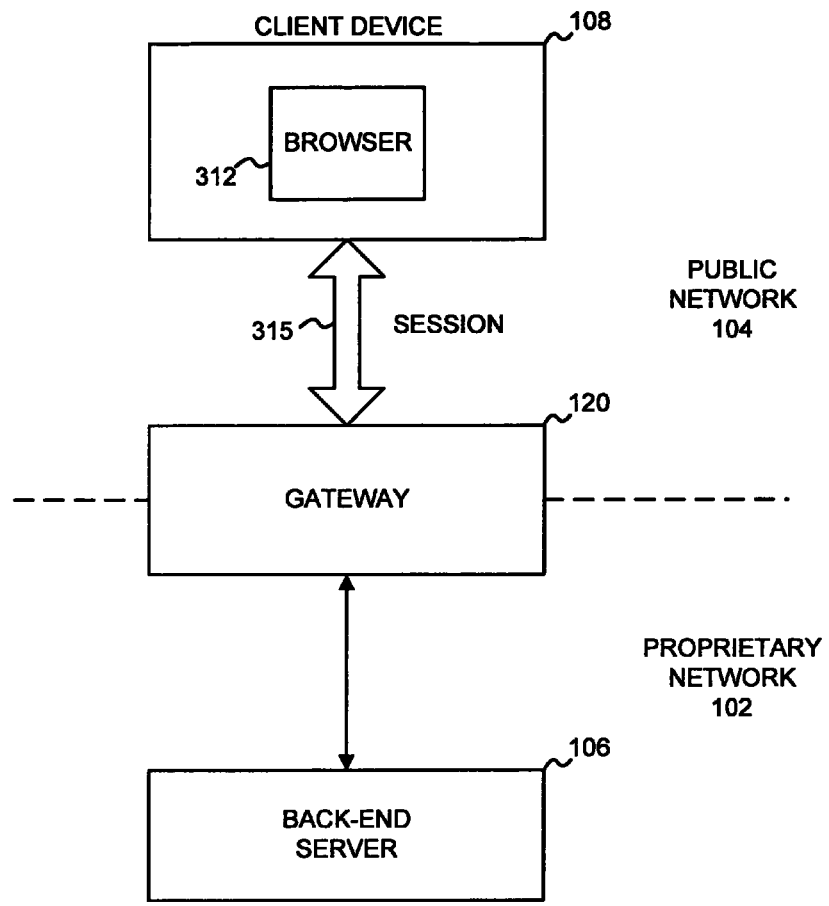
FIG. 3 is a diagram conceptually illustrating an exemplary SSL VPN.

FIG. 3 is a diagram conceptually illustrating an exemplary connection between client device 108, such as a remote client computer, and back-end server 106, via a gateway 120 (e.g., an SSL VPN gateway 120). Back-end server 106 may provide applications or services targeted to the users of the proprietary network in which back-end server 106 resides. Client device 108 may connect to back-end server 106 through gateway 120 to access these applications or services. For example, back-end server 106 may act as an email server or as a database application through which users can access a customer database. Client device 108 may connect to gateway 120 via a web connection 315, such as an SSL connection, using a browser program 312. Browser programs, such as the INTERNET EXPLORER browser from MICROSOFT Corporation, are common applications on computer systems. Additionally, because most browsers include support for encrypted communications using SSL, client device 108 may be ready to connect with gateway 120 without installing additional software or requiring any custom configurations of client device 108.

Accordingly, by connecting to gateway 120 using a web browser, client device 108 can connect to proprietary network 102 by simply navigating to a predetermined Uniform Resource Locator (URL) of the gateway 120. In situations in which back-end server 106 acts as a data server, back-end server 106 may transmit markup data, such as XML data, and XSLT scripts that browser 312 may use to generate HTML code that may be displayed to the user of client device 108. The XML data and XSLT scripts may contain later binding URL-based link entities that cannot be fully defined until the XML data files and XSLT scripts are merged at the client. The XSLT scripts may, for example, be based on the XSLT 1.0 standard and additionally include XPath (XML Path Language).

System Operation

In general, gateway 120 operates to process data files and code (e.g., scripts) that define how the data files are to be formatted as these files pass through the gateway 120, from back-end server 106, and on the way to client device 108. Gateway 120 may modify the files so that resources that are referenced in the data files or the code, and that refer back to back-end server 106, can later be called by client device 108 through gateway 120.

Figure 4:
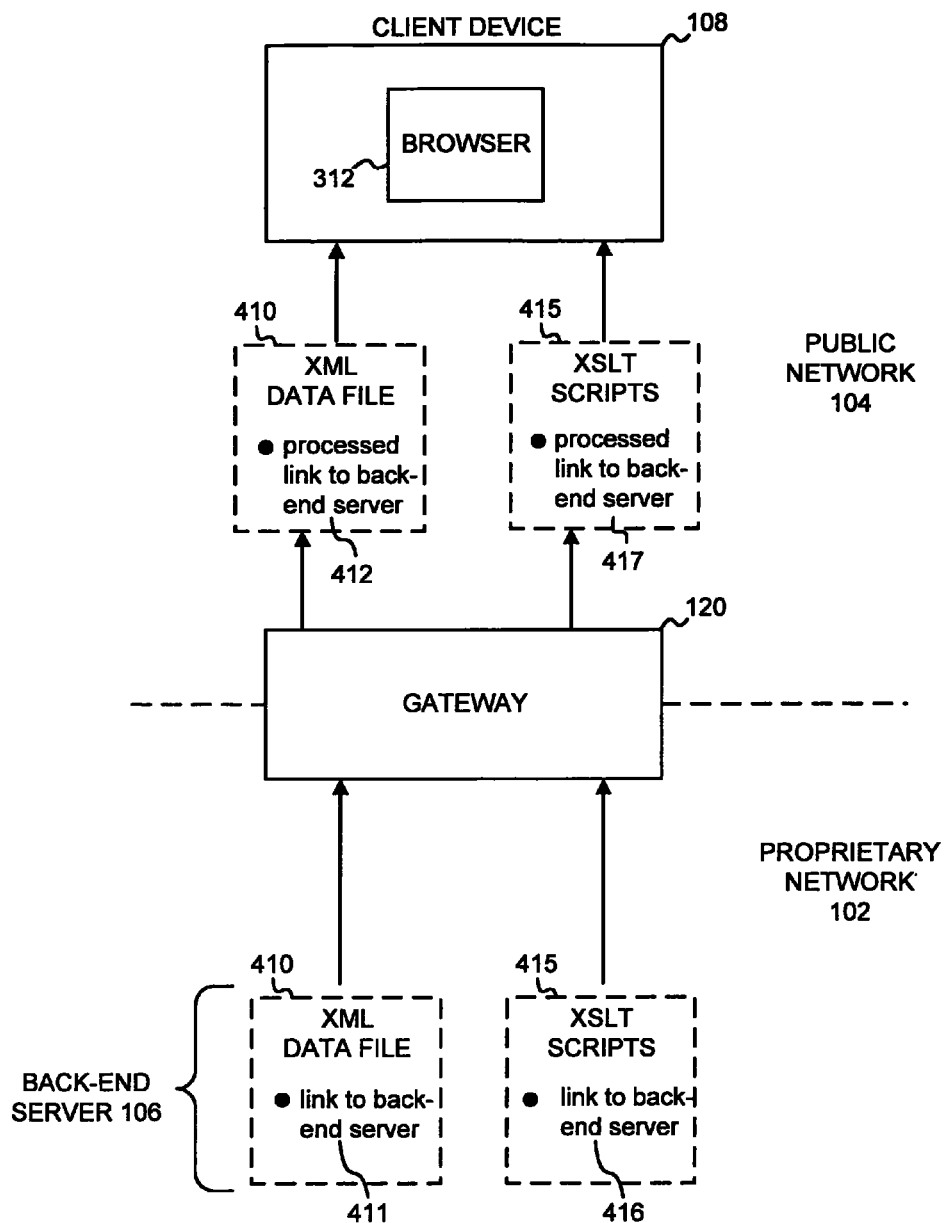
FIG. 4 is a high-level diagram conceptually illustrating exemplary files that may be transmitted to a client device from a back-end server.

FIG. 4 is a high-level diagram conceptually illustrating exemplary files that may be transmitted to client device 108 from back-end server 106. The files may include one or more XML data files 410 and one or more XSLT script files 415. Files 410 and 415 may include URL link-based entities 411 and 416 that refer to back-end server 106. Link-based entity 416, in particular, may be a later binding URL-based link entity that cannot be fully resolved until merged with other files at client device 108. Normally, client device 108, when processing files 410 and 415, would contact back-end server 106 to resolve the URL link-based entities. Because back-end server 106 is behind gateway 120, however, client device 108 is not able to directly contact back-end server 106.

Consistent with an aspect of the invention, gateway 120 may process XML data file 410 and XSLT script file 415 such that links 411 and 416, when resolved at client device 108, will resolve to gateway 120, which may then forward the requests to back-end server 106. The "processed" version of these links, links 412 and 417, are shown in FIG. 4 after processing by gateway 120.

Figure 5:
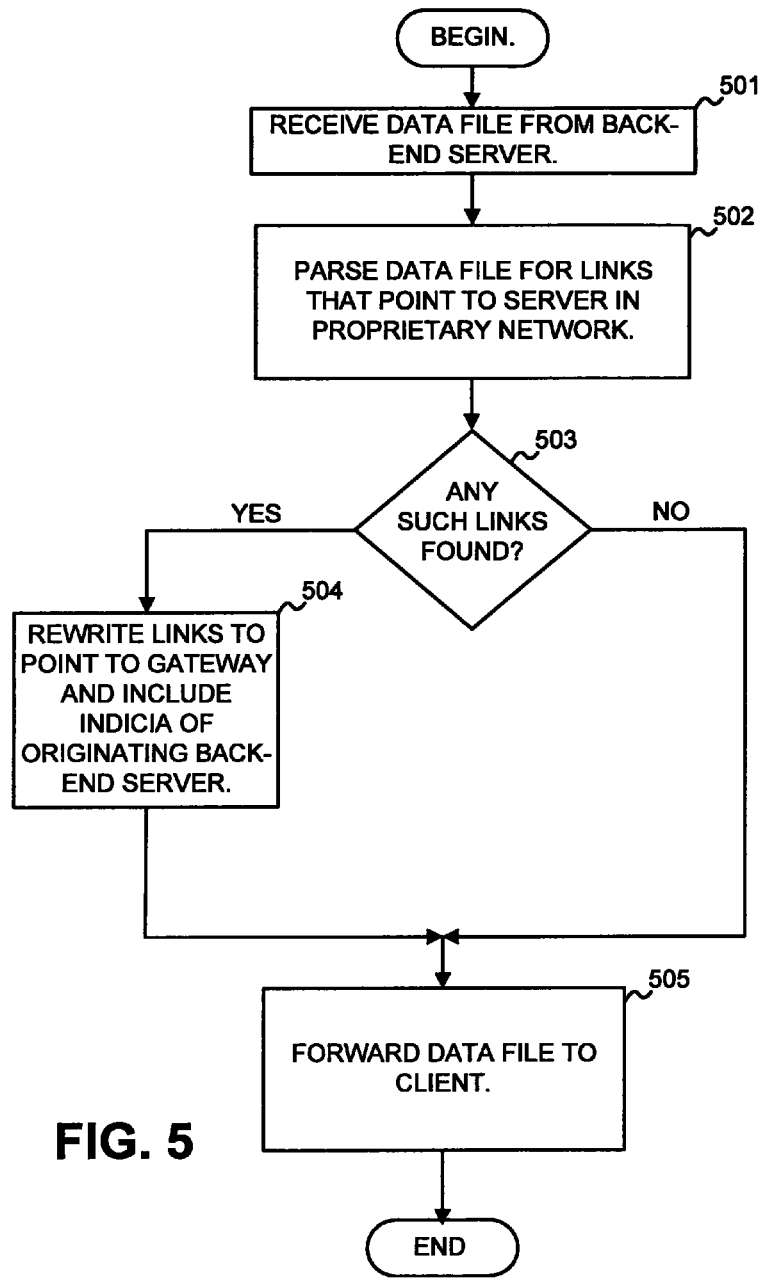
FIG. 5 is a flow chart illustrating exemplary operations for handling data files, such as an XML data file, at the gateway shown in FIG. 1.

FIG. 5 is a flow chart illustrating exemplary operations for handling data files, such as XML data file 410, at gateway 120. Data file 410 may be received from a back-end server, such as back-end server 106, in response to a resource request from a client device 108 (act 501). Gateway 120 may parse the received data file 410 for URL-based links that are fully resolved and that point to servers in proprietary network 102 (act 502). If any such links are located, they may be rewritten to point to gateway 120 (acts 503 and 504). The rewritten link may include an indication of the intended back-end server. Data file 410 may then be forwarded to client device 108 (act 505). In this manner, links in data file 410 to devices that are within proprietary network 102 are modified so that the client device will request the resource from gateway 120, which may then forward the request to the appropriate resource within proprietary network 102.

FIG. 6 is a diagram illustrating a portion of an exemplary XML data file before and after processing by gateway 120. XML code 610 represents the portion of the data file before processing by gateway 120. As shown, XML code 610 includes a link 612 that can be directly resolved to "http://192.168.15.100/today/new.xml." Assume that the IP address "192.168.15.100" refers to back-end server 106 on proprietary network 102, which cannot be directly reached from public network 104. XML code 620 represents the portion of the data file after processing by gateway 120. The new link, link 622, may now be resolved to "http://companygateway.org/today/new.xml?backendserver=192.168.15.100." Client device 108, when accessing new link 622, will access gateway 120 instead of back-end server 106. Gateway 120, when it receives the new link back client device 108, may analyze the link to determine the correct back-end server 106 to which the request should be forwarded.

Figure 7:
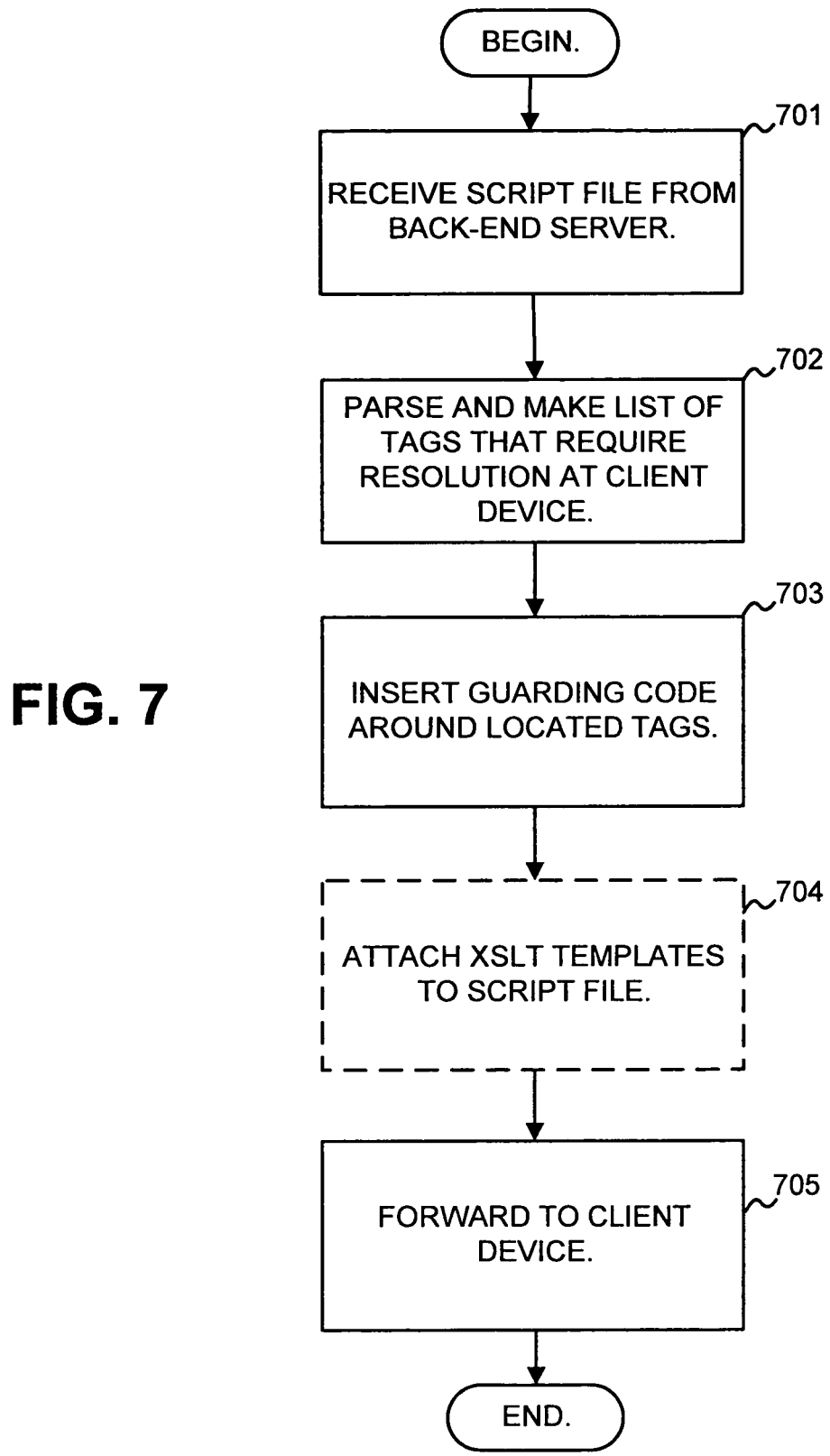
FIG. 7 is a flow chart illustrating exemplary operations for handling script files, such as an XSLT script file, at the gateway shown in FIG. 1.

FIG. 7 is a flow chart illustrating exemplary operations for handling script files, such as XSLT script file 415, at gateway 120. Script file 415 may be initially received by gateway 120 (act 701). Script file 415 may then be parsed for tags (links) that require resolution at client device 108 (act 702). These tags may represent later binding URL-based link entities that will be later resolved at client device 108. Guarding code may be inserted around these tags (act 703). Guarding code, as this term is used herein, refers to code inserted into script file 415 that is called when script file 415 is later executed by client device 108. In one implementation, the guarding code operates at client device 108 to dynamically rewrite the later binding URL-based link entities so that, after the links are resolved at the client, they are modified to refer to gateway 120. Gateway 120 may optionally ensure that the functions implemented within the guarding code have unique names relative to other functions in XSLT scripts 415 so that the guarding code does not interfere with calls to the other functions. An example of guarding code inserted into an XSLT script is described in more detail below with reference to FIG. 8.

Gateway may 120 optionally attach XSLT templates to script file 415 (act 704). The XSLT template may be, for example, inserted into a response to client 108 as a XSL link reference or directly copied into the response. The templates may generally define additional functionality that is implemented by the guarding code. In other implementations, when the additional functionality is already part of the response to client device 108 as a part of other templates, there may be no need to attach the additional XSLT templates. Gateway 120 may thus perform an intelligent analysis of the files being transmitted to client device 108 before deciding whether to attach the XSLT template. Script file 415 may then be forwarded to client device 108 (act 505).

FIG. 8 is a diagram illustrating an exemplary portion of script file 415 before and after processing by Gateway 120. Script code 810 represents the portion of script file 415 before processing by gateway 120. As shown, script code 810 includes a line 811, an XSL "attribute" element, which adds the attribute named "HREF" to an element. Line 812 is an XSL "value-of" element that extracts the value of an XML element and adds it to the output stream of a transformation. The "select" portion of line 812 specifies a path that is to be used to extract the value of the XML element. In essence, these lines essentially cause a value associated with the attribute named "HREF" to be loaded from an XML file resource that is referenced by "@SYMBOL." The "@SYMBOL" reference is resolved at client device 108 and may not be determinable at gateway 120.

Script code 820 illustrates the portion of script file 415 after processing by gateway 120, as performed in act 703. In this example, gateway 120 has inserted a number of lines of script, which are shown in bold and generally labeled as script 821 and 822. Script 821 and 822 operates to call a custom template ("GetDanaURL"). The template includes rules that together with the additional script 821 and 822 shown in FIG. 8 operates to take the link that is resolved by "@SYMBOL" and rewrite the link, at client device 108, to a form that will reference gateway 120 instead of any resources in proprietary network 102. The rewritten link, in a manner similar to rewritten link 622 (FIG. 6), will redirect requests to the back-end servers to gateway 120. More specifically, in one implementation, the rewritten link may use the known XSLT1.0 and XPATH technologies to tokenize the link entities and direct the link request back to 120 with information that can be used to recover the original link so that it can then be used request further information from the back-end servers. Gateway 120 may then forward the resource requests to the back-end servers, as appropriate.

Exemplary Implementation

Figure 9:
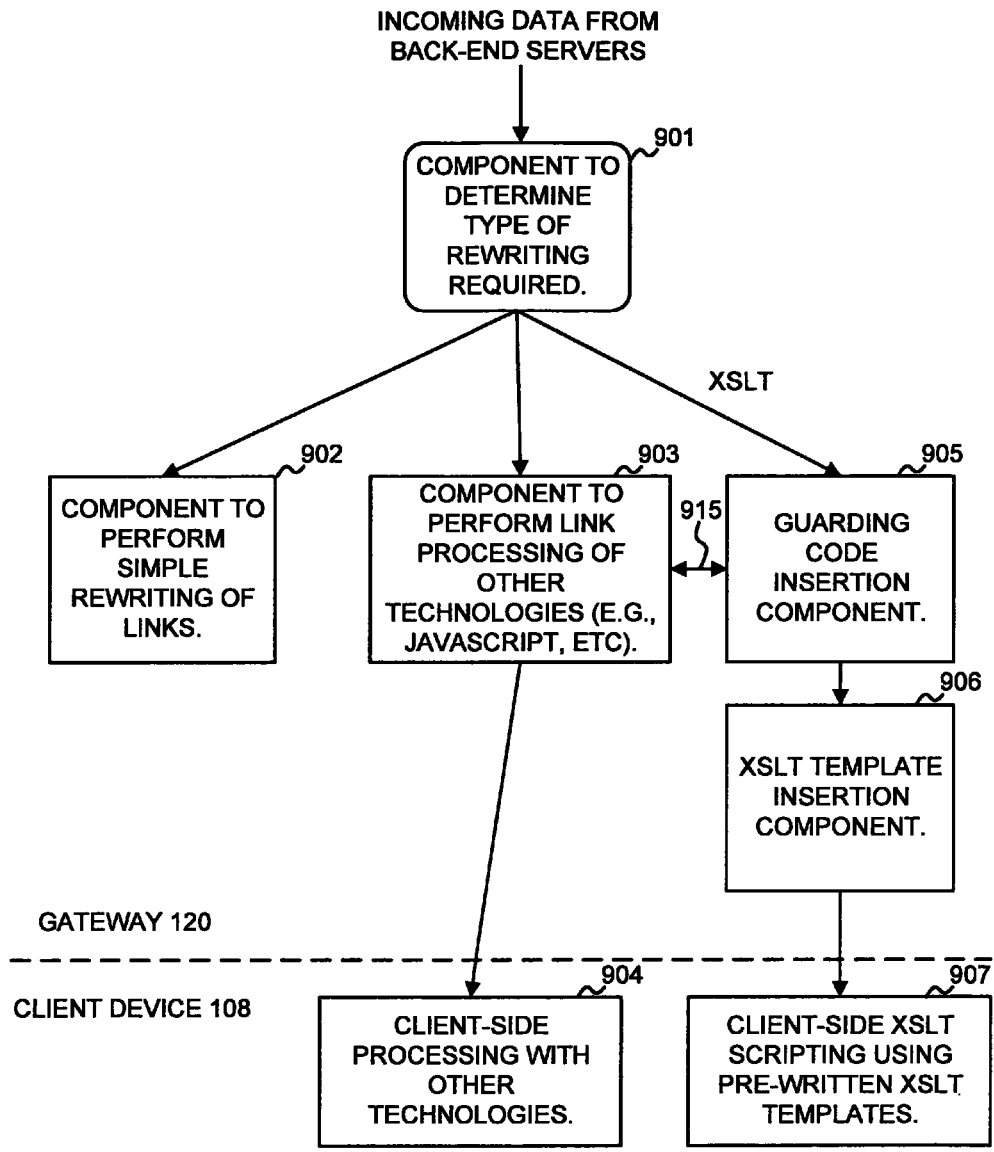
FIG. 9 is an exemplary diagram conceptually illustrating overall operation of an SSL VPN gateway in processing data received from back-end servers and destined for one or more client devices.

FIG. 9 is an exemplary diagram conceptually illustrating overall operation of gateway 120 in processing data received from back-end servers and destined for one or more client devices. A component 901 may determine the type of link rewriting required (if any) within the data received from the back-end server. Some data from the back-end servers, such as HTML files or XML files (such as the exemplary XML code portion shown in FIG. 6) may be processed by component 902 to perform simple rewriting of links.

In addition to simple link rewriting, a component 903 may perform link processing of certain technologies other than XSLT. For example, JAVASCRIPT, VisualBasic (VB) script, or other technologies may include URL-based link entities that refer to the back-end servers. Technologies exist for processing such links and may also be implemented in gateway 120. These technologies may include corresponding client-side processing (block 904).

As previously discussed, gateway 120 may account for late binding URL-based link entities in XSLT scripts by inserting guarding code into the XSLT scripts. The guarding code may call additional functions contained in templates. This functionality of gateway 120 is illustrated in FIG. 9 as guarding code insertion component 905 and XSLT template insertion component 906. The scripts, as modified by 120, may then be processed at the client device (block 907). In situations in which the incoming data includes both XSLT scripts and links within other technologies (e.g., JAVASCRIPT, VB script, etc.), guarding code insertion component 905 may operate in conjunction with components 903 to perform link processing. This is illustrated graphically in FIG. 9 via integration link 915.

CONCLUSION

As described above, a network device implements a gateway for client devices. The network device may modify scripts by inserting guarding code into the scripts. The guarding code may execute at the client device and may rewrite later binding URL-based link entities to refer to the network device. In this manner, the network device can be used to provide security and other functions for back-end servers while allowing external clients to access the back-end servers without requiring the installation of custom software on the client devices.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code or hardware design—it being understood that a person of ordinary skill in the art would be able to design software and control hardware to implement the aspects based on the description herein.

The foregoing description of embodiments of the invention provides illustration and description, but is not intended to be exhaustive or to limit the invention to the precise form disclosed. Modifications and variations are possible in light of the above teachings or may be acquired from practice of the invention. For example, although some of the operations described above were described in a particular order, the operations may be amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed:
1. A network device comprising:
a memory to store instructions; and
a processor to execute the instructions to:
establish a session between the network device and a client device,
at least one file being transmitted between the network device and the client device;
examine an eXtensible Stylesheet Language Transformations (XSLT) script being transmitted to the client device through the network device, the XSLT script including a tag representing a later-binding uniform resource locator (URL)-based link entity;
rewrite the XSLT script by inserting guarding code,
the guarding code including:
first guarding code that executes at the client device to rewrite the later-binding URL-based link entity to refer to the network device and is inserted before the later-binding URL-based link entity, and
second guarding code that executes at the client device to rewrite the later-binding URL-based link entity to refer to the network device and is inserted after the later-binding URL-based link entity;
determine information regarding an XSLT template, the XSLT template defining additional functionality implemented by the guarding code;
analyze the at least one file to identify whether a particular functionality is implemented by the XSLT template;
selectively include information regarding the XSLT template, implementing the particular functionality, in the XSLT script, based on whether the guarding code implements the particular functionality,
the information regarding the XSLT template being included when the guarding code does not implement the particular functionality, and
the information regarding the XSLT template not being included when the guarding code implements the particular functionality; and
send the rewritten XSLT script, with the selectively included information regarding the XSLT template, to the client device.

2. The network device of claim 1, where the session between the network device and the client device is established as a Secure Sockets Layer (SSL) Virtual Private Network (VPN) session.

3. The network device of claim 1, where the processor is further to:
receive resource requests from the client device based on the rewritten later-binding URL-based link entity.

4. The network device of claim 3, where the processor is further to:
forward the resource requests to a server device based on information extracted from the rewritten later-binding URL-based link entity.

5. The network device of claim 1, where the XSLT template is associated with the XSLT script as a XSL link reference.

6. The network device of claim 1, where the XSLT template is associated with the XSLT script by being directly copied into the XSLT script.

7. The network device of claim 1, where
the network device is a gateway located between the client device and a server device, and
the processor is further to:
receive the XSLT script from the server device.

8. A method comprising:
establishing, by a processor, a session between a network device and a client device,
at least one file being transmitted between the network device and the client device;
identifying, by the processor, an eXtensible Stylesheet Language Transformations (XSLT) script being transmitted to the client device through the network device,
the XSLT script including a tag representing a later-binding uniform resource locator (URL)-based link entity;
rewriting, by the processor, the XSLT script by inserting guarding code,
the guarding code including:
first guarding code that executes at the client device to rewrite the later-binding URL-based link entity to refer to the network device and is inserted before the later-binding URL-based link entity, and
second guarding code that executes at the client device to rewrite the later-binding URL-based link entity to refer to the network device and is inserted after the later-binding URL-based link entity;
determining, by the processor, information regarding an XSLT template, the XSLT template defining additional functionality implemented by the guarding code;
analyzing, by the processor, the at least one file to identify whether a particular functionality is implemented by the XSLT template;
selectively including, by the processor, information regarding the XSLT template, implementing the particular functionality, in the XSLT script, based on whether the guarding code implements the particular functionality,
the information regarding the XSLT template being included when the guarding code does not implement the particular functionality, and
the information regarding the XSLT template not being included when the guarding code implements the particular functionality; and
sending, by the processor, the rewritten XSLT script, with the selectively included information regarding the XSLT template, to the client device.

9. The method of claim 8, where the session between the network device and the client device is established as a Secure Sockets Layer (SSL) Virtual Private Network (VPN) session.

10. The method of claim 8, further comprising:
receiving resource requests from the client device based on the rewritten later-binding URL-based link entity.

11. The method of claim 10, further comprising:
forwarding the resource requests to a server device based on information extracted from the rewritten later-binding URL-based link entity.

12. The method of claim 8, where the XSLT template is associated with the XSLT script as a XSL link reference.

13. The method of claim 8, where the XSLT template is associated with the XSLT script by being directly copied into the XSLT script.

14. The method of claim 8, where
the network device is a gateway located between the client device and a server device, and
the method further includes:
receiving the XSLT script from the server device.

15. A non-transitory computer-readable medium storing instructions, the instructions comprising:
one or more instructions which, when executed by a processor, cause the processor to:
establish a session between a network device and a client device,
at least one file being transmitted between the network device and the client device;
identify an eXtensible Stylesheet Language Transformations (XSLT) script being transmitted to the client device through the network device, the XSLT script including a tag representing a later-binding uniform resource locator (URL)-based link entity;
rewrite the XSLT script by inserting guarding code, the guarding code including:
  first guarding code that executes at the client device to rewrite the later-binding URL-based link entity to refer to the network device and is inserted before the later-binding URL-based link entity, and
  second guarding code that executes at the client device to rewrite the later-binding URL-based link entity to refer to the network device and is inserted after the later-binding URL-based link entity;
determine information regarding an XSLT template, the XSLT template defining additional functionality implemented by the guarding code;
analyze the at least one file to identify whether a particular functionality is implemented by the XSLT template;
selectively include information regarding the XSLT template, implementing the particular functionality, in the XSLT script, based on whether the guarding code implements the particular functionality,
  the information regarding the XSLT template being included when the guarding code does not implement the particular functionality, and
  the information regarding the XSLT template not being included when the guarding code implements the particular functionality; and
send the rewritten XSLT script, with the selectively included information regarding the XSLT template, to the client device.

16. The non-transitory computer-readable medium of claim 15, where the session between the network device and the client device is established as a Secure Sockets Layer (SSL) Virtual Private Network (VPN) session.

17. The non-transitory computer-readable medium of claim 15, where the instructions further include:
one or more instructions to receive resource requests from the client device based on the rewritten later-binding URL-based link entity.

18. The non-transitory computer-readable medium of claim 17, where the instructions further include:
one or more instructions to forward the resource requests to a server device based on information extracted from the rewritten later-binding URL-based link entity.

19. The non-transitory computer-readable medium of claim 15, where the XSLT template is associated with the XSLT script as a XSL link reference.

20. The non-transitory computer-readable medium of claim 15, where the XSLT template is associated with the XSLT script by being directly copied into the XSLT script.

* * * * *